M. A. KETTLER.
HYDRAULIC CLUTCH.
APPLICATION FILED FEB. 19, 1913. RENEWED FEB. 18, 1916.
1,186,661.
Patented June 13, 1916.
2 SHEETS—SHEET 1.
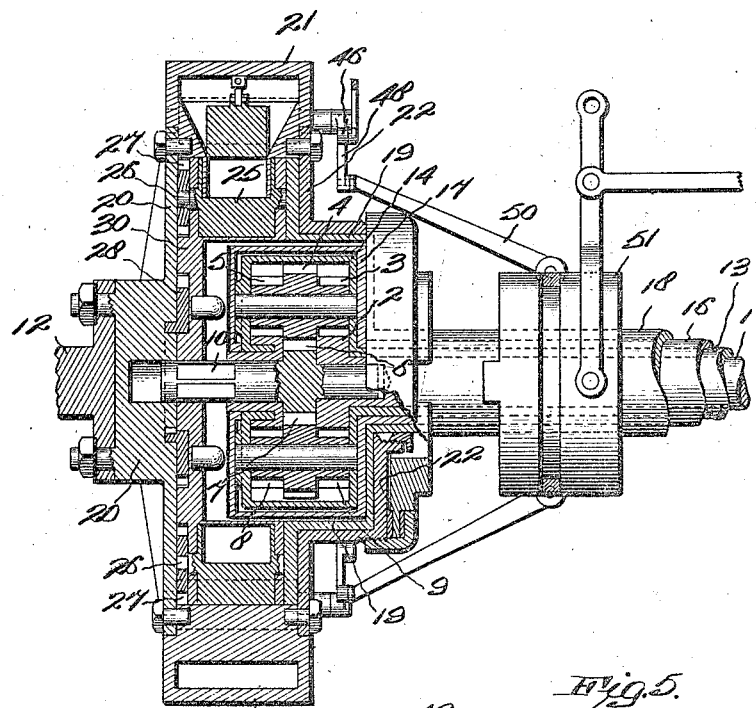
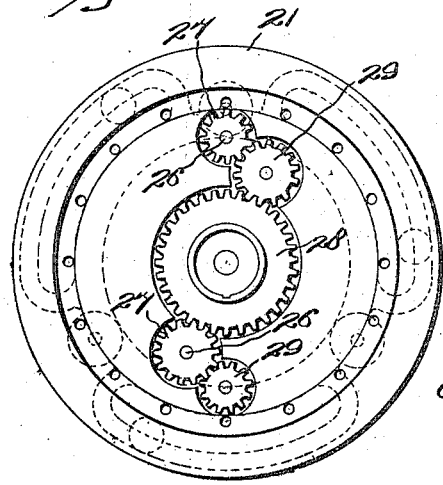
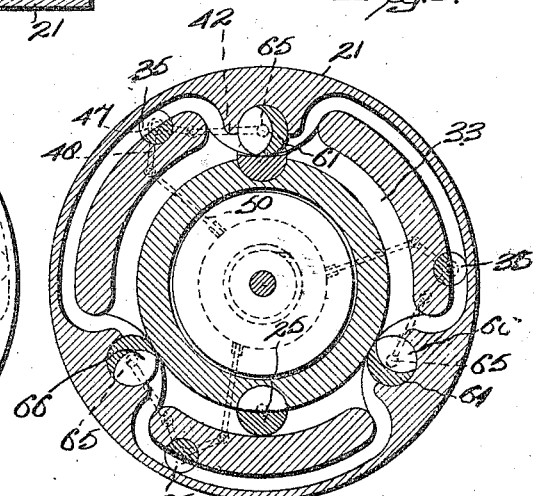

M. A. KETTLER.
HYDRAULIC CLUTCH.
APPLICATION FILED FEB. 19, 1913. RENEWED FEB. 18, 1916.
1,186,661. Patented June 13, 1916.
2 SHEETS—SHEET 2.
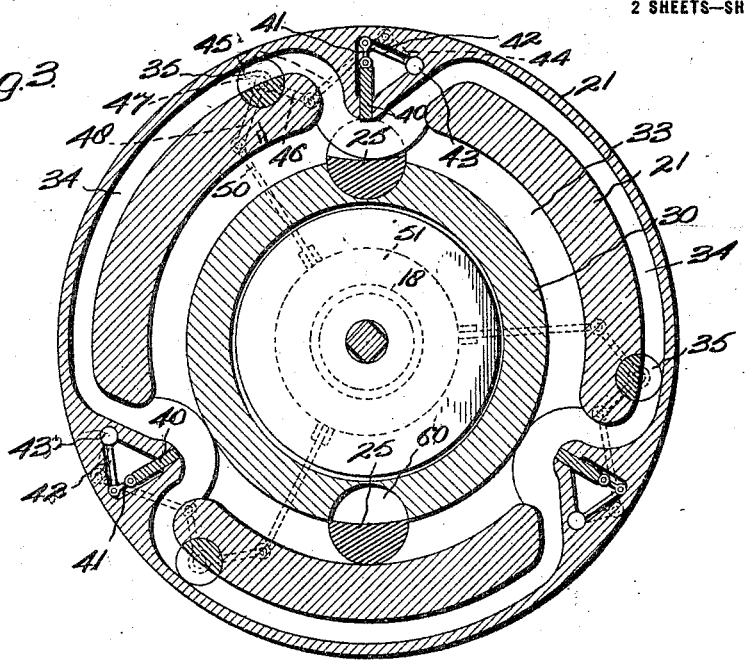
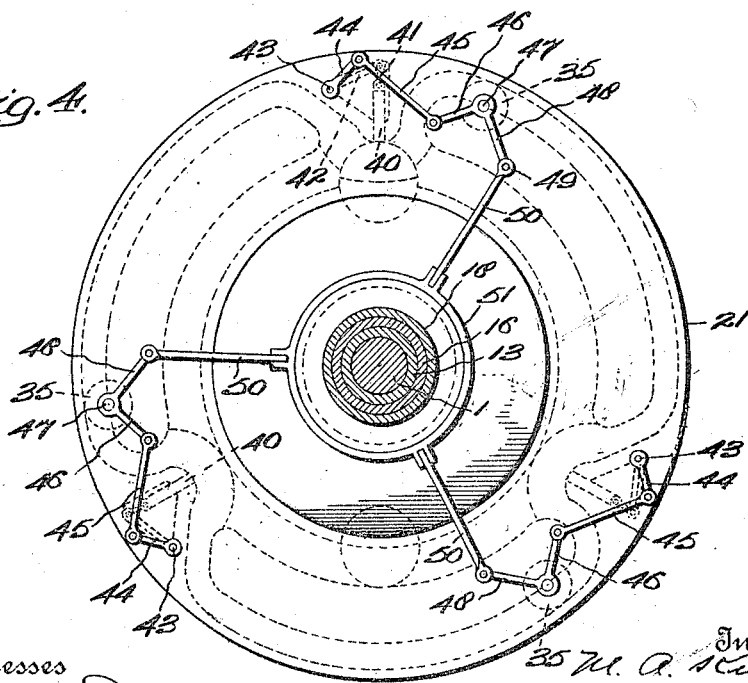

UNITED STATES PATENT OFFICE.

MILTON A. KETTLER, OF WASHINGTON, DISTRICT OF COLUMBIA.

HYDRAULIC CLUTCH.

1,186,661. Specification of Letters Patent. Patented June 13, 1916.

Application filed February 19, 1913, Serial No. 749,525. Renewed February 18, 1916. Serial No. 79,222.

*To all whom it may concern:*

Be it known that I, MILTON A. KETTLER, a citizen of the United States, residing at Washington, in the District of Columbia, have invented certain new and useful Improvements in Hydraulic Clutches; and I do hereby declare the following to be a full, clear, and exact description of the invention, such as will enable others skilled in the art to which it appertains to make and use the same.

This invention relates to hydraulic clutches, and has for its object to produce a transmission gearing, which will be simple in construction, comparatively inexpensive to manufacture, and one which will be more efficient in action than those of like nature which have been heretofore proposed.

To these ends, the invention consists in the novel details of construction and combination of parts, more fully hereinafter disclosed and particularly pointed out in the claims.

Referring to the accompanying drawings forming a part of this specification, in which like numerals designate like parts in all the views:—Figure 1 is a longitudinal sectional view of a clutch made in accordance with my invention; Fig. 2 is an elevational view of a portion of the parts shown in Fig. 1 and illustrating the gearing connecting the controlling parts of the clutch; Fig. 3 is an enlarged transverse sectional view of a portion of the parts shown in Fig. 1 and illustrating the particular improvements constituting my invention; Fig. 4 is an end elevational view partly in section of the clutch, and showing in full lines the operating parts illustrated by dotted lines in Fig. 3; and, Fig. 5 is a diagrammatic transverse sectional view of a slightly modified form of my invention.

This invention constitutes an improvement over the construction disclosed in U. S. Patent # 879,045, dated Feb. 11, 1908, to W. W. Henderson, and entitled Fluid clutch. The general construction of the power transmitting parts is substantially the same as in said patent, and therefore, need not be described with particularity herein. However, it is said:—1 indicates a driven shaft on which is mounted the pinion 2 meshing with the pinion 3, provided with the gear 4 and with the pinion 5, as best shown in Fig. 1. The gear 4 meshes with the gear 6 mounted on the short shaft 10, and the said gear 6 in turn meshes with the gear 7, rigid with the pinions 8 and 9.

Through the parts just mentioned, as well as others which are not illustrated, but which are fully disclosed in the said patent above, power is transmitted from the driving shaft 12 to the driven shaft 1. The said shaft 1 also has mounted thereon the sleeve 13 carrying the casing member 14 inclosing the gears 4 and 7, and the said shaft 1 is also surrounded by the sleeve 16 provided with the drum-like casing 17, which in turn incloses the casing member 14, as will be clear from the drawings.

In addition to the members 14 and 17, just described, the sleeve 18 likewise surrounding the shaft 1, carries the rotating drum member 19 which in turn incloses the members 14 and 17.

Rigid with the driving shaft 12 is the plate, or casing member 20, having the outer chamber member 21 and the back plate member 22 rigid therewith.

The parts so far mentioned, are, or may be, duplicates of the corresponding parts disclosed in the patent above, and from said patent, it will now be clear that if power is applied to the shaft 12, the casing members 20, 21 and 22 will rotate around the drum-like members 19, 14 and 17, and the planetary gears 4, 6, etc., will cause power to be transmitted to the shaft 1.

The said patent above, likewise discloses the following parts:—Mounted in the plate 30 located inside the casing members 20, 21 and 22, and coacting with the drum 19, are: the rotating abutments 25 having projections 26 on which are mounted pinions 27, meshing with the pinions 29, which in turn mesh with the central gear 28 carried between the said plate 30 and the casing member 20. In other words, as the shaft 12 rotates and carries with it the parts mentioned above, the said central gear 28 will cause the abutments 25 to rotate through their pinions 27 in synchronism with said shaft, all as is likewise disclosed in said patent above. The said outer rotating casing members 20, 21 and 22 inclose between themselves and the inner rotating drum member 19 and plate 30, the annular fluid channel 33, and the said rotating abutments 25 are adapted to block said channel except at stated intervals, all as will be likewise clear from Fig. 3, and from said patent above. The said rotating casing member 21 likewise is provided with by-pass channels 34 controlled by the valves or cocks 35, as in said patent above, and it will now be further understood from said patent, that the plate 30 and drum 19 constitute an inner rotating drum member or system, to which power is applied from the outer casing members 20, 21 and 22, for that as the driving casing 21 revolves around the inner driven drum members 19 and 30, fluid confined in the channel 33 will be compressed between a member carried by the casing 21 and one or more of the rotating abutments 25, and power will thereupon be transmitted from the said casing 21 through the rotating abutments 25 to the drum members 30 and 19, and through the planetary gearing to the shaft 1, all in the manner more fully disclosed in said patent above.

No novelty is claimed herein for any of the parts *per se* so far mentioned.

The special improvement constituting this invention will be readily understood from the following:—In this invention, I mount reciprocating valve like members 40 in the casing 21 and connect the same by means of the links 41 and 42 to the pivots 43, which are rigid with the levers 44 connected by the links 45 to the bell crank arms 46 pivoted as at 47, and rigid with the arm 48, connected as at 49 to the operating connections 50, carried by the sliding sleeve 51 surrounding the sleeve 18. In the said patent above, instead of the sliding member 40, there was provided a member lettered 29 in said patent, which projected entirely across the fluid channel, and which did not permit of its being removed from or brought into said channel, so that it had the disadvantage of always driving fluid or oil in front of the same, and thereby, imparting a greater or less churning action to the said fluid. This said churning action inevitably resulted in a greater or less heating effect, and is objectionable from other reasons. It has, however, been proposed to overcome this objection by pivotally mounting the member 29, shown in said patent, so that it might be turned on its pivot and entirely removed from the channel lettered 33 in this invention.' Whereas such an improvements serves to overcome the objections it was sought to remove, yet at the same time, a new objection arose, which will be understood from the following:—When the engine is running at a high speed, and it is attempted to turn a pivoted member into an oil channel, such as 33, considerable resistance is encountered, and especially is this the case when no by-pass valve, such as 35, is employed, and also when the channel is almost closed and a large amount of power is being transmitted from the member 21 to the member 30. In fact, when operating an automobile, the resistance to this turning action might be encountered at a critical moment, and the efficiency of the clutch for practical uses greatly impaired. Accordingly, this invention was designed to, and does, remove the above objections, as will be clear from the following:—By providing the sliding member 40, as just stated, it may readily be brought into and removed from the channel 33 with a minimum amount of power, because it will be met with a minimum of resistance, owing to the fact that it is firmly supported by the casing 21; and further, by providing the valve 35 and having it open and close at the right times, the said channel 33 may be first closed partially or entirely by the sliding abutments 40 and later the valves 35 may be closed with a turning movement without encountering any substantial resistance at all. Accordingly, in this said invention, when the sliding abutments 40 are withdrawn from the channel 33, as illustrated in Fig. 3, they do not cause any churning of the oil or fluid at all, and yet they can be readily forced into said fluid or oil when the engine is running at top-most speed with the same ease that they could be forced into said fluid when the engine is running at a very low speed, all as will be now clear. That is to say, by operating the sleeve 51, backward and forward over the sleeve 18, the connection 50 will turn the bell crank members 48 and 46 and through the connections 45, 44, 42 and 41, the members 40 will be reciprocated into and out of the channel 33, and at the same time, since the valves 35 are mounted upon the pivots 47 of the bell cranks, they will be likewise turned in synchronism with the movements of the said abutments 40. That is to say, the said valves 35 will be open so long as the members 40 are encountering any serious resistance and will be closed only after the said members have reached their extreme closing position. However, such motion could be readily provided, and it comes well within the limits of this invention.

It will be understood, of course, from the said patent above, that as the member 21 revolves around the member 30, the abutments 25 are rotated on their axes through the gears 28, 29 and 27, so that even though the sliding abutments 40 extend entirely across the channel 33, yet they will enter the cutaway portions 60 of the said abutments at the proper time, and will therefore, pass the same.

Should the abutments 40 be partially or entirely withdrawn from the channel 33, the turning of the rotary abutments 25, through the means just described, will continue as before, and therefore, it makes no difference to the operation of this portion of the clutch whether the abutments 40 extend into the channel 33 or not.

It is further obvious that for small installations, the valves 35 may be entirely done away with, or if desired, they may be disconnected from the links 50 or from the bell cranks 48 and permanently closed.

In the modification shown in Fig. 5, instead of the sliding abutments 40, I have provided cylindrical abutments 61, which constantly span the channel 33, and which pass the rotary abutments 25 in a manner similar to the rigid abutments 29 in the said patent above. The main difference between this modification and the structure disclosed in said patent, is that in this case the valves 35 may be connected with the sliding sleeve 51, as illustrated above, and at the same time the link motion there employed, including the lever 44, may be connected directly with the pivot 65 of said cylindrical abutment 61 and partially turn the same so as to cause a greater or less leakage past said valves and through their cut-away portions 66, all as will be clear from the drawings.

It is obvious that those skilled in the art may vary the details of construction, as well as the arrangement of parts without departing from the spirit of my invention, and therefore, I do not wish to be limited to the above disclosures, except as may be required by the claims.

What I claim is:—

1. In a fluid clutch, the combination of a driving member; a driven member; a fluid passage between said members; a rotary abutment carried by one of said members adapted to project into and close said passage; a movable abutment carried by the other of said members adapted to be so moved as to permit a greater or less leakage of fluid; a by-pass coacting with said abutments; a valve controlling said by-pass; and connections for simultaneously operating said movable abutment and valve, substantially as described.

2. In a fluid clutch, the combination of a driving member; a driven member; a fluid passage between said members; a rotary abutment provided with a cut-away portion carried by one of said members adapted to project into and close said passage; a movable abutment carried by the other of said members adapted to be so moved as to permit a greater or less leakage of fluid; connections for rotating said first named abutment to permit said movable abutment to automatically pass the same; a by-pass coacting with said abutments; a valve controlling said by-pass; and manually controlled connections for operating said movable abutment and valve, substantially as described.

3. In a fluid clutch, the combination of a driving member; a driven member; a fluid chamber between said members; a rotary abutment having a cut-away portion carried by one of said members and adapted to close said chamber; a sliding abutment carried by the other of said members adapted to also close said chamber; means for slidably adjusting said last named abutment to permit a desired leakage past the same in said chamber; means for automatically turning said rotary abutment to permit said sliding abutment to pass; a by-pass coacting with said abutments; and a valve controlling said by-pass, substantially as described.

4. In a fluid clutch, the combination of a driving member; a driven member; a fluid chamber between said members; a rotary abutment having a cut-away portion carried by one of said members and adapted to abutment having a cut-away portion carried by the other of said members adapted to also close said chamber; means for slidably adjusting said last named abutment to permit a desired leakage past the same in said chamber; means for automatically turning said rotary abutment to permit said sliding abutment to pass; a by-pass coacting with said abutments; a valve controlling said by-pass; and connections for simultaneously operating said sliding abutment and valve, substantially as described.

In testimony whereof I affix my signature in presence of two witnesses.

MILTON A. KETTLER.

Witnesses:
T. A. WITHERSPOON,
R. M. PARKER.